United States Patent
Morrison et al.

(10) Patent No.: US 7,225,982 B2
(45) Date of Patent: Jun. 5, 2007

(54) BULK CARD ORDERING SYSTEM AND METHODS

(75) Inventors: Kevin Morrison, Omaha, NE (US); Todd Raymond Nuzum, Omaha, NE (US); Douglas William Presser, Omaha, NE (US); John Killion, Omaha, NE (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 10/789,455

(22) Filed: Feb. 26, 2004

(65) Prior Publication Data

US 2005/0103841 A1 May 19, 2005

Related U.S. Application Data

(60) Provisional application No. 60/520,432, filed on Nov. 14, 2003.

(51) Int. Cl.
*G06F 17/60* (2006.01)

(52) U.S. Cl. .................. 235/385; 235/375; 705/26; 705/28

(58) Field of Classification Search .............. 235/385, 235/379–381, 486–487, 375; 705/38–39, 705/35, 26
See application file for complete search history.

(56) References Cited

U.S. PATENT DOCUMENTS

| | | | | |
|---|---|---|---|---|
| 5,576,951 A * | 11/1996 | Lockwood | .................... | 705/27 |
| 5,799,316 A * | 8/1998 | Audren | .................... | 707/104.1 |
| 5,883,452 A * | 3/1999 | Masuda | .................... | 235/380 |
| 6,014,645 A * | 1/2000 | Cunningham | ................. | 705/38 |
| 6,289,319 B1 * | 9/2001 | Lockwood | .................... | 705/35 |
| 6,405,181 B2 * | 6/2002 | Lent et al. | .................... | 705/38 |
| 6,453,300 B2 * | 9/2002 | Simpson | .................... | 705/26 |
| 6,671,358 B1 * | 12/2003 | Seidman et al. | ......... | 379/93.12 |
| 6,802,538 B2 * | 10/2004 | Laurash et al. | ............... | 283/61 |
| 6,877,656 B1 * | 4/2005 | Jaros et al. | .................. | 235/380 |
| 2002/0174016 A1 * | 11/2002 | Cuervo | ........................ | 705/16 |
| 2003/0177064 A1 * | 9/2003 | Emura | .......................... | 705/14 |
| 2004/0054587 A1 * | 3/2004 | Dev et al. | ..................... | 705/14 |
| 2004/0064412 A1 * | 4/2004 | Phillips et al. | ................ | 705/41 |
| 2004/0069845 A1 * | 4/2004 | Goldstein et al. | ........... | 235/380 |
| 2004/0099730 A1 * | 5/2004 | Tuchler et al. | .............. | 235/380 |
| 2004/0139318 A1 * | 7/2004 | Fiala et al. | ................. | 713/165 |
| 2004/0143512 A1 * | 7/2004 | Sturr | ........................... | 705/26 |
| 2005/0199707 A1 * | 9/2005 | Beck et al. | .................. | 235/380 |
| 2005/0263587 A1 * | 12/2005 | Martinez | ..................... | 235/380 |

* cited by examiner

*Primary Examiner*—Thien M. Le
*Assistant Examiner*—Edwyn Labaze
(74) *Attorney, Agent, or Firm*—Townsend and Townsend and Crew LLP (57) ABSTRACT

A method for ordering a plurality of presentation instruments in a single order includes receiving at a host computer system a request from a purchaser to order the plurality of presentation instruments. The method also includes sending one or more files that are executable by a computer of the purchaser to produce one or more corresponding display screens programmed to collect purchase information relating to the plurality of presentation instruments. The method further includes receiving at the host computer system the purchase information from the purchaser. The purchase information includes a recipient information file. The method also includes delivering the presentation instruments in accordance with the purchase information.

19 Claims, 10 Drawing Sheets

"BULK CARD ORDERING SYSTEM AND METHODS"

CROSS-REFERENCES TO RELATED APPLICATIONS

This application is a non-provisional of and claims the benefit of U.S. Provisional Patent Application No. 60/520,432, entitled "Bulk Card Ordering System And Methods," filed on Nov. 14, 2003, by Kevin Morrison, et al., the entire disclosure of which is herein incorporated by reference for all purposes.

This application is related to the following co-pending, commonly assigned U.S. patent applications which are incorporated by reference in their entirety: U.S. Provisional Patent Application No. 60/520,488, entitled "System for Accounting," filed on Nov. 14, 2003; U.S. Provisional Patent Application No. 60/520,486, entitled "Stored Value Lottery Card and Methods," filed on Nov. 14, 2003; U.S. patent application Ser. No. 10/714,437, entitled "Open Loop Stored Value System," filed on Nov. 14, 2003; and U.S. patent application Ser. No. 10/714,441, entitled "Open Loop Stored Value Account Configuration," filed on Nov. 14, 2003.

BACKGROUND OF THE INVENTION

The present invention relates generally to electronic ordering systems. More particularly, the present invention relates to systems and methods for ordering cards (e.g., presentation instruments) in bulk.

Presentation instruments, such as credit cards and the like, have become ubiquitous as devices to settle purchase transactions. Individuals usually apply for or request cards for themselves, one at a time. Other entities, such as banks or employers, often have a need to obtain many cards simultaneously. Sometimes, especially around the holiday season, individuals may experience the need to obtain several cards, such as gift cards, contemporaneously. The demand for some entities to obtain several cards contemporaneously has created a need for better card ordering systems.

BRIEF SUMMARY OF THE INVENTION

Embodiments of the invention thus provide a method for ordering a plurality of presentation instruments in a single order. The method includes receiving at a host computer system a request from a purchaser to order the plurality of presentation instruments and sending one or more files that are executable by a computer of the purchaser to produce one or more corresponding display screens programmed to collect purchase information relating to the plurality of presentation instruments. The method also includes receiving at the host computer system the purchase information from the purchaser. The purchase information includes a recipient information file. The method further includes delivering the presentation instruments in accordance with the purchase information. In some embodiments, the presentation instruments are credit cards, gift cards, smart cards, stored value cards, and/or debit cards. Delivering the presentation instruments in accordance with the purchase information may include delivering the presentation instruments to each of a plurality of recipients. Delivering the presentation instruments in accordance with the purchase information may include delivering the presentation instruments to the purchaser. Delivering the presentation instruments in accordance with the purchase information may include delivering the presentation instruments to a designee of the purchaser.

In some embodiments the method includes receiving at the host computer system a request from a user to view usage information relating to a presentation instrument and sending a file to a computer of the user. The file may include the usage information. The recipient information file may include a spread sheet, a text file, and/or a data file. The purchase information may include a message to be embossed on each card. The purchase information may include a recipient name to be embossed on each card.

Other embodiments of the invention provide a method for ordering a plurality of presentation instruments in a single order. The method includes receiving at a host computer system a request from a purchaser to order the plurality of presentation instruments. The presentation instruments include non-personalized cards. The method also includes sending one or more files that are executable by a computer of the purchaser to produce one or more corresponding display screens programmed to collect purchase information relating to the plurality of presentation instruments. The method also includes receiving at the host computer system the purchase information from the purchases and delivering the presentation instruments in accordance with the purchase information. The presentation instruments may be credit cards, gift cards, smart cards, stored value cards, and/or debit cards. In some embodiments, the method includes receiving at the host computer system a request from a user to view usage information relating to a presentation instrument and sending a file to a computer of the user. The file may include the usage information.

Still other embodiments of the present invention provide a system for processing orders for a plurality of presentation instruments ordered simultaneously. The system includes a computing device programmed to: receive a request from a purchaser computer to order the plurality of presentation instruments; send one or more files that are executable by a computer of the purchaser to produce one or more corresponding display screens programmed to collect purchase information relating to the plurality of presentation instruments; receive the purchase information from the purchaser computer; and send a least a portion of the purchase information to a presentation instrument production system. The system may include a usage information system programmed to: receive a request from a user to view usage information relating to one of the plurality of presentation instruments; and send a file to a computer of the user. The file comprises the usage information. The purchase information may include a message to be embossed on each card. The purchase information may include a recipient name to be embossed on each card. The purchase information may include a recipient information file. The recipient information file may include a spread sheet, a text file, and/or a data file. The presentation instruments may include a credit cards, gift cards, smart cards, stored value cards, and/or debit cards. The presentation instruments may include non-personalized cards.

Still other embodiments of the invention provide a method of purchasing a plurality of presentation instruments in a single order. The method includes sending to a host computer system from a purchaser computer a request to order the plurality of presentation instruments and receiving from the host computer system at the purchaser computer one or more files that are executable by the purchaser computer to produce one or more corresponding display screens programmed to collect purchase information relating to the plurality of presentation instruments. The method also includes sending the purchase information from the purchaser computer to the host computer system. The purchase information includes a recipient information file. The method may include receiving the presentation instruments in accordance with the purchase information.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Embodiments of the present invention provide bulk card ordering systems. Herein, "card" will be used generically to refer to any of a number of well known presentation instruments. Such presentations include, for example, credit cards, smart cards, debit cards, and the like, and of which may be gift cards, including retailer cards and the like. In some embodiments, the cards may be "branded" cards (e.g., cards carrying the VISA® or MASTERCARD® brands), in which case transactions using the cards may be settled using a branded network associated with the card. Although the examples used herein to describe embodiments of the invention relate to gift cards, the invention is not limited to gift card ordering systems, as is apparent to those skilled in the art in light of this disclosure.

According to one embodiment of the present invention, an entity, such as a bank or employer, (hereinafter "purchaser") places an order for a number of gift cards in a single order. The order is placed using an interactive, web-based system. Through the system, the purchaser may specify the type of card, a message for each card, a denomination for each card, a recipient name for each card, and the like. In some embodiments, the purchaser may specify the types of purchases that may be made using the card. The purchaser also may designate delivery information and/or pay for the entire order using the interactive system. Some embodiments provide the purchaser or other authorized user the ability to monitor card usage.

Embodiments of the invention may be useful in a number of situations. For example, employers may provide gift cards to employees. Giving gift cards overcomes several disadvantages associated with giving cash, yet allows the recipient to make purchases at almost any location. Parents may give cards to their children. The accounts associated with the cards may include restrictions such that the children can purchase certain items (e.g., school books, meals, etc.), while other items (e.g., alcoholic beverages) are restricted. Employers may provide the cards to traveling employees. The employees may be allowed to use the cards for authorized, travel-related expenses, while being prohibited from using the cards for personal purchases. The employer may monitor the purchases of the employee. Many other examples are possible.

Figure 1:
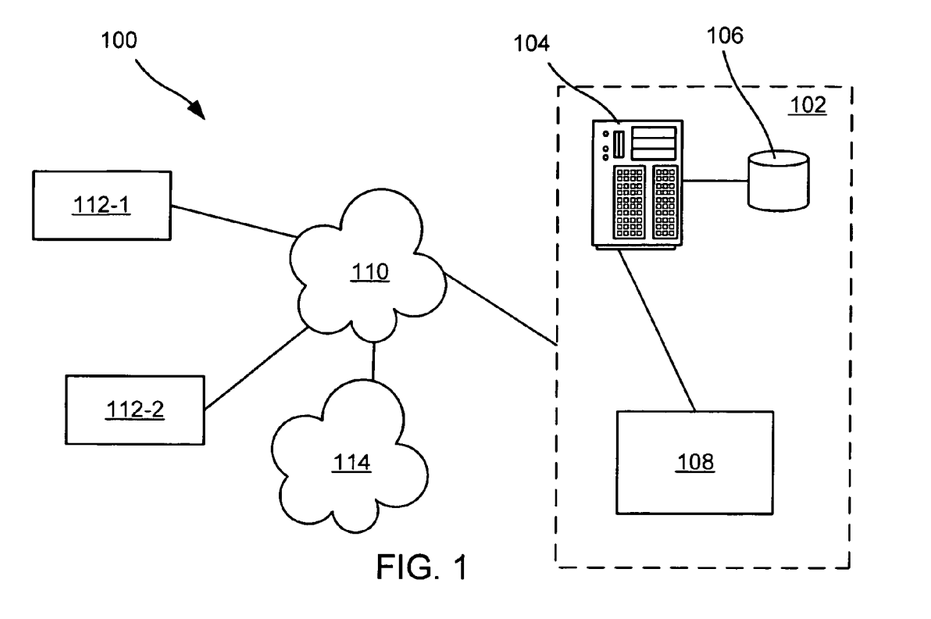
FIG. 1 depicts a bulk card ordering system according to embodiments of the present invention.

Having described embodiments of the invention generally, attention is directed to FIG. 1, which illustrates one exemplary embodiment of a system 100 for ordering presentation instruments in bulk. The system 100 includes a host computer system 102, which may include, for example, server computers, personal computers, workstations, web servers, and/or other suitable computing devices. The host computer system 102 includes application software that programs the host computer system 102 to perform one or more functions according to the present invention. For example, application software resident on the host computer system 102 may program the host computer system 102 to receive bulk orders, prepare the presentation instruments, and establish associated accounts. The host computer system 102 may include one or more of the aforementioned computing devices, as well as storage devices such as databases, disk drives, optical drives, and the like. The storage devices may include solid state memory, such as RAM, ROM, PROM, and the like, magnetic memory, such as disc drives, tape storage, and the like, and/or optical memory, such as DVD. The host computer system 102 may be fully located within a single facility or distributed geographically, in which case an internal network may be used to integrate the host computer system 102. Many other examples are possible and apparent to those skilled in the art in light of this disclosure.

In a specific embodiment, the host computer system includes a bulk order web server 104, a card usage database 106, and a presentation instrument production system 108. The bulk order web server 104 may be any of a number of well known computing devices. In one embodiment, the bulk order web server 104 hosts the web pages through which customers place bulk orders, as will be described. The card usage database 106 may be any of a number of well known data storage devices. The card usage database 106 stores transaction information relating to transactions settled using cards obtained according to embodiments of the present invention. Cards holders or other authorized users may access information stored at the card usage database 106, as will be described in more detail hereinafter with respect to FIG. 2C. The presentation instrument production system 108 receives orders for cards, produces the cards (e.g., embosses and/or programs the cards), and mails the cards to the recipients.

The system 100 also includes a network 110, which may be the Internet, an intranet, a wide area network (WAN), a local area network (LAN), a virtual private network, any combination of the foregoing, or the like. The network 110 may include both wired and wireless connections, including optical links. The network 110 may comprise portions of the Public Switched Telephone Network (PSTN). Through the network 110, customer computers 112 communicate with the host computer system 102.

The system 100 also includes one or more customer computers 112. Customer computers may comprise any computing device that enables a customer to place orders according to embodiments of the invention. For example, a customer may use a personal computer to access the bulk order web server 104 and place an order, as will be described in more detail hereinafter.

The system 100 also may include a transaction processing network 114 through which merchants submit transactions for settlement. The transaction processing network may comprise any of a number of well known transaction processing networks, including, for example, a so-called "open network" such as a branded network (e.g., a VISA® or MASTERCARD® network), or a banking network (e.g., the ABA network), or a so called "closed network," such as a specific retailer network (e.g., WalMart® or Bed, Bath, and Beyond®, which may be operated by a third party such as ValueLink®.

Figure 2A:
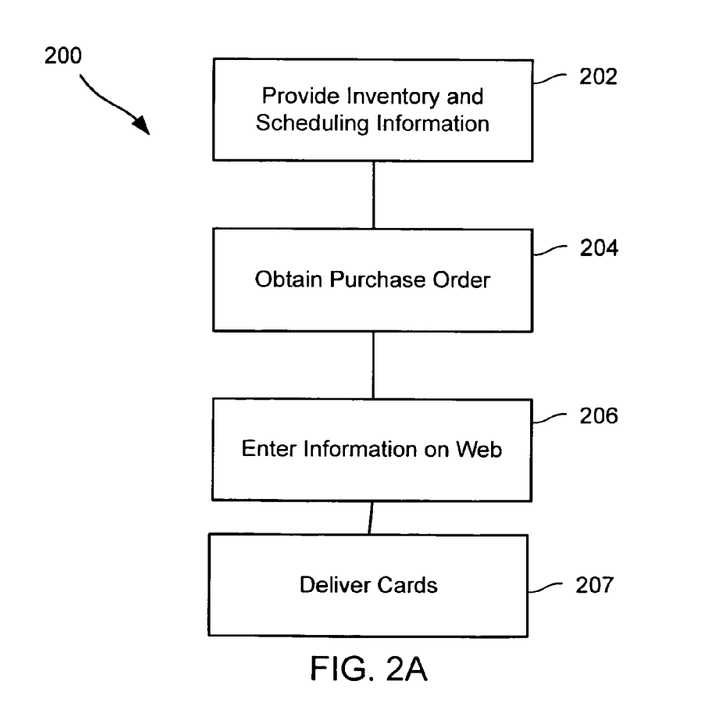
FIGS. 2A and 2B depict methods of ordering cards in bulk that may be used in the system of FIG. 1.

Having described an exemplary system 100 according to embodiments of the invention, attention is directed to FIG. 2A, which illustrates a method 200 according to an embodiment of the invention. The method may be implemented in the system 100 of FIG. 1. It should be noted that the method 200 is exemplary, and other methods according to other embodiments may include more, fewer, or different steps than those described here. Further, the steps need to be conducted in the order illustrated and described. This specific embodiment relates to ordering gift cards; however, other types of cards may be ordered.

The method 200 begins at block 202, wherein a purchaser provides basic ordering information, such as the number of cards being ordered and the desired delivery date, to a card provider. This may allow the card provider to check its inventory of cards and its current production schedule. The provider issues the purchaser a purchase order number that the purchaser uses when providing the detailed order information. This takes place at block 204. At block 206, the purchaser uses a web-based ordering tool to send detailed order information to the provider. At block 207, the provider prepares and delivers the cards. The ordering process will be described in more detail immediately hereinafter.

Figure 2B:
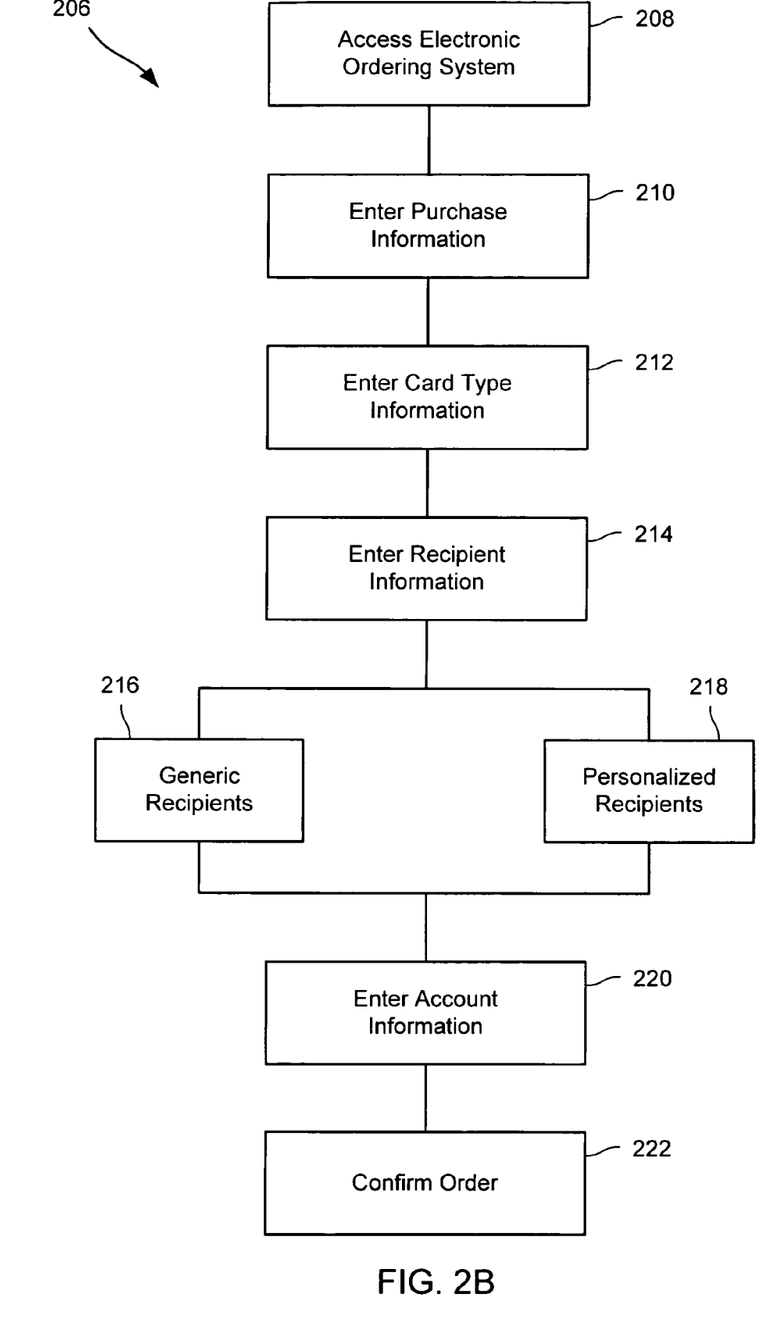

Attention is directed to FIG. 2B in combination with FIGS. 3A through 3G for a more detailed description of the ordering process from block 206. As previously described, embodiments of the invention may be implemented using a web-based ordering tool that a purchaser might access through the Internet or other appropriated network. Thus, FIGS. 3A-3G illustrate a series of screen displays that may appear on a purchaser's computer as the purchaser completes the order. The display screens may appear in a well-known browser environment, as is known in the art. These display screens illustrate but one possible ordering process.

At block 208, a purchaser accesses the ordering system. After appropriate security checks, the purchaser is presented with a purchaser information display screen 300 of FIG. 3A. The purchaser uses the purchaser information display screen 300 to enter purchaser information at block 210. The purchaser information might include, for example, one or more identification numbers 302 that relate to the purchaser, the purchaser's name 304, address 306, telephone numbers 308, and the like. The purchaser information also may include the purchase order number 310 given to the purchaser by the provider. Once the purchaser completes the information in the purchaser information display screen 300, the purchaser selects a "continue" button 312 to send the information to a web server, which may be located with a host computer system. Selecting the "continue" button 312 also causes a card type information screen 320 of FIG. 3B to be displayed for the customer.

Figure 3A:
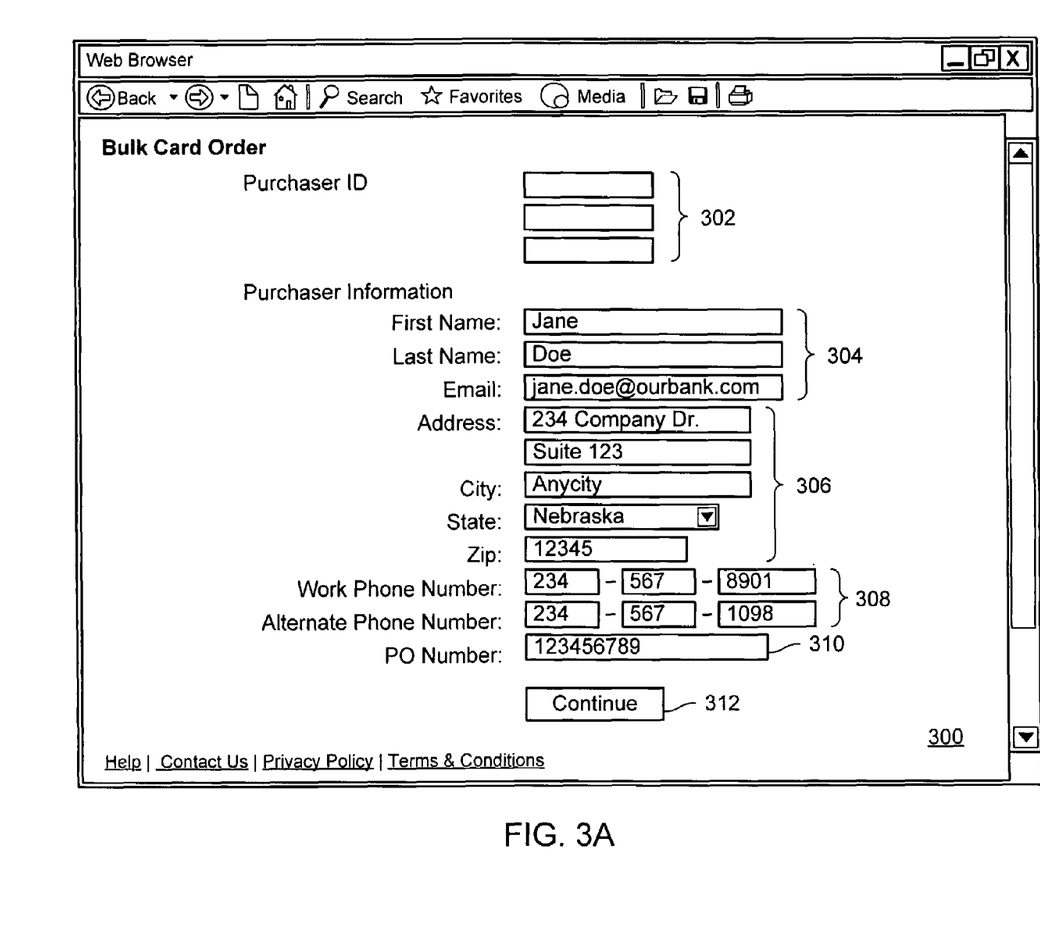
FIGS. 3A–3G depict a series of display screens that may be used to obtain bulk card orders using the systems and methods of FIGS. 1 and 2.
Figure 3B:
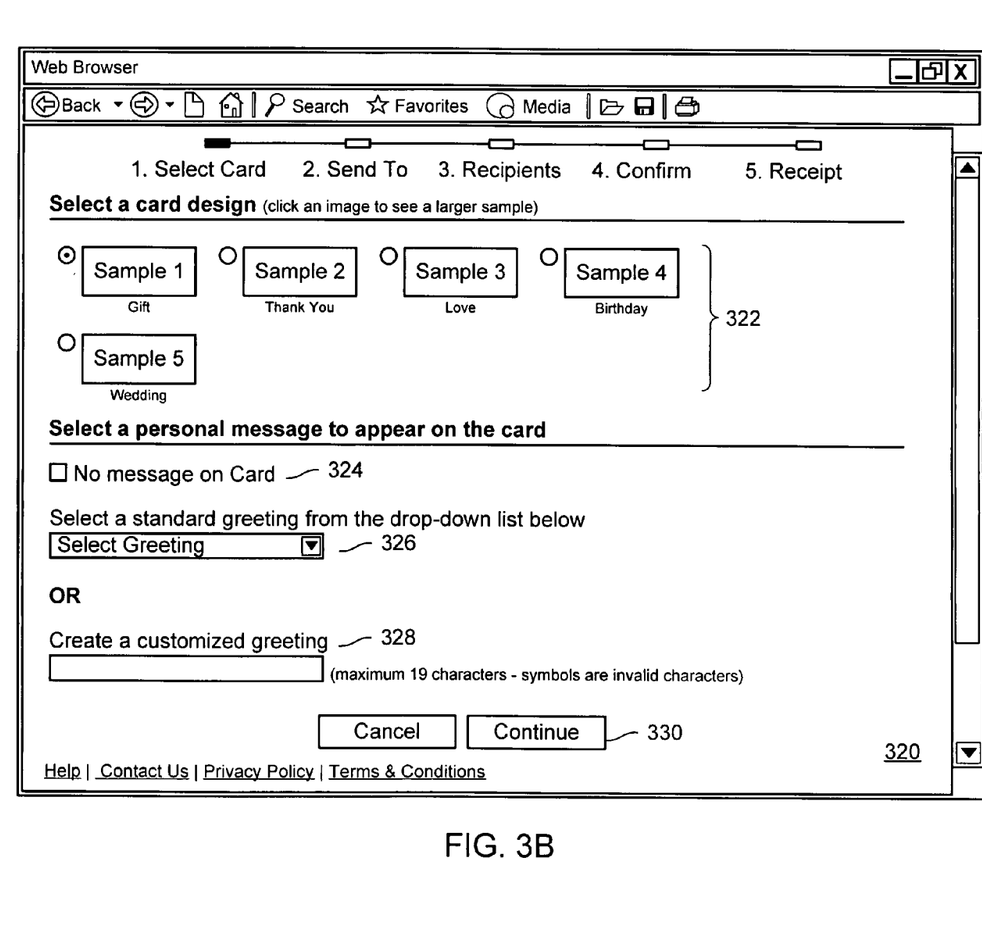

The purchaser uses the card type information screen 320 to enter card type information at block 212. Card type information may include a card design 322. For example, in the case of gift cards, the cards may carry a birthday, wedding anniversary, get well, or like theme. The cards also may have a personal message. The purchaser may select "no message" 324, a standard greeting 326, or a custom greeting 328, which may be character limited. Selecting "continue" 330 sends the information to the provider's computer and causes the recipient information display screen 340 of FIG. 3C to be returned to the purchaser's computer.

Figure 3C:
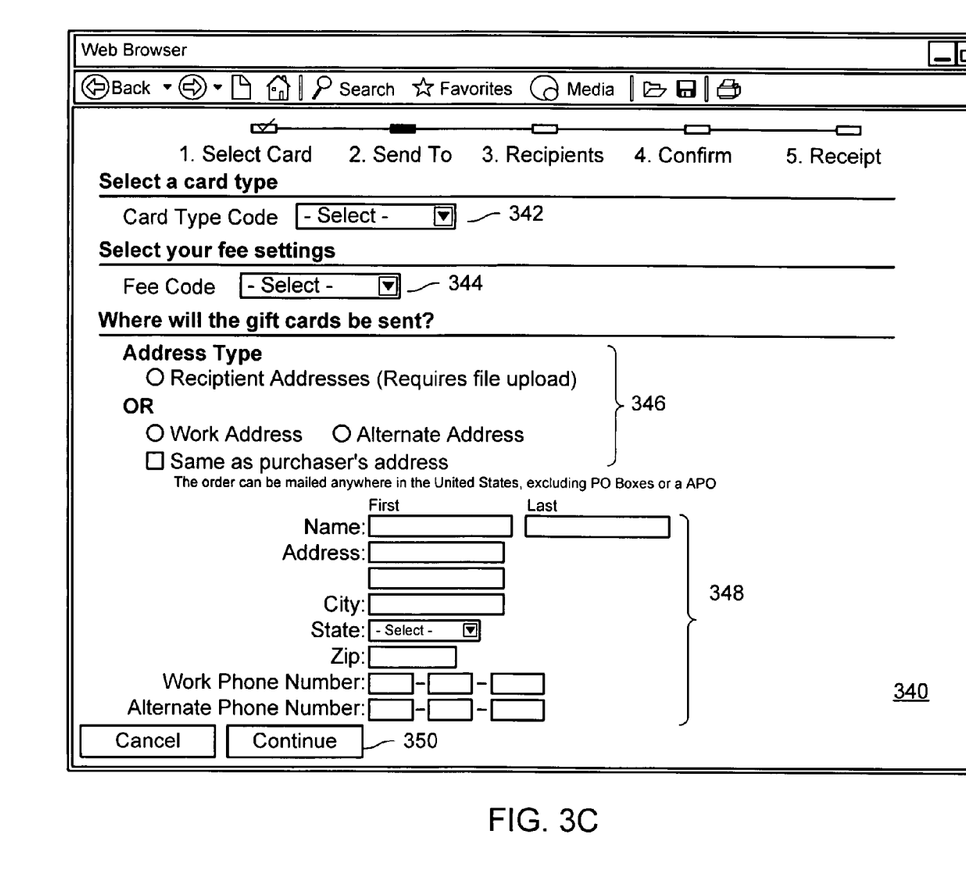

The purchaser uses the delivery information display screen 340 to enter recipient information at block 214. Recipient information may include, for example, the type of card 342 the purchaser wishes to present to the recipient. The card type may be, for example, a credit card, debit card, or the like. In some embodiments, the card type may be determined by the purchaser's relationship to the provider. For example, if the purchaser is a bank, the card type may be a branded credit card that the bank typically acquires for its customers from the provider. Recipient information also may include a fee code 344. In some embodiments, accounts associated with cards may require payment of a fee. In some cases, the purchaser may pass the fee on to the recipient. Alternatively, the purchaser may elect to pay extra for the card so that the recipient does not have to pay a fee. The fee code 344 may be used to make these selections.

Continuing with a discussion of FIG. 3C, the purchase information may include delivery information 346. The delivery information may be used to tell the provider where to send the cards. If the purchaser elects to have the cards delivered to the recipients, then the purchaser may need to provide each recipient's address information. As will be described, this may be done by uploading a file, such as a spreadsheet. If the purchaser elects to have the cards set to him, then the purchaser may select his work address, an alternate address, or an address previously provided as the purchaser's address. The purchaser's address 348 may be filled in automatically based on the purchaser's selection. Otherwise, the purchaser enters this information. When the recipient information display screen 340 is complete, the purchaser selects the continue button 350 to send the information and advance to the next display screen.

Figure 3D:
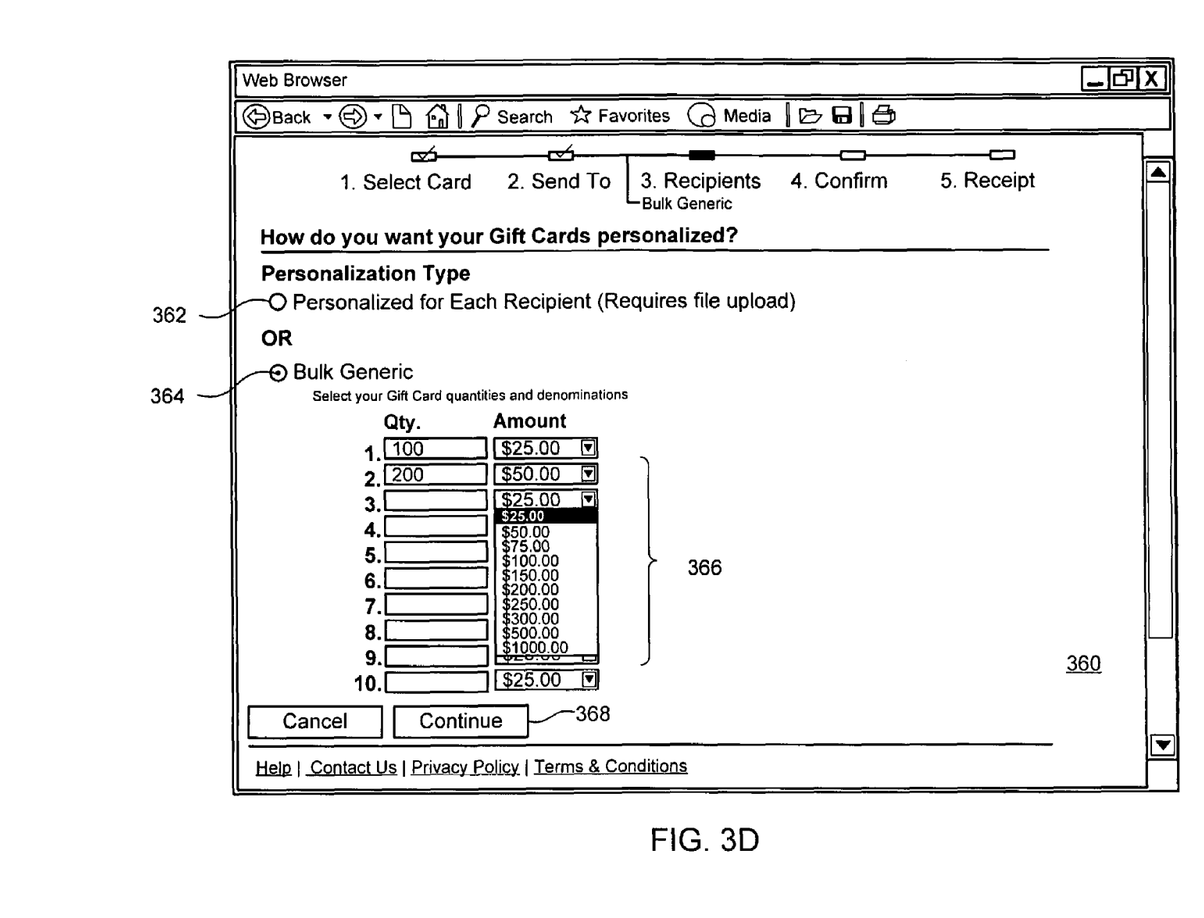

Selecting the continue button 350 of the delivery information display screen 340 causes the recipient information display screen 360 of FIG. 3D to be returned to the purchaser's computer. Using this display screen 360, the purchaser can select to personalize each card for each recipient by selecting the personalized radio button 362 or select bulk generic cards by selecting the generic radio button 364. If the purchaser selects the generic radio button 364, then, using the card selection area 366, the purchaser enters the quantity of cards the purchaser wishes to purchase of each denomination of card. This operation is reflected as block 216 of FIG. 2B. If the purchaser selects personalized cards, then selecting the continue button 368 after selecting the personalized button 362 returns the personalized recipient display screen 380 of FIG. 3E.

Figure 3E:
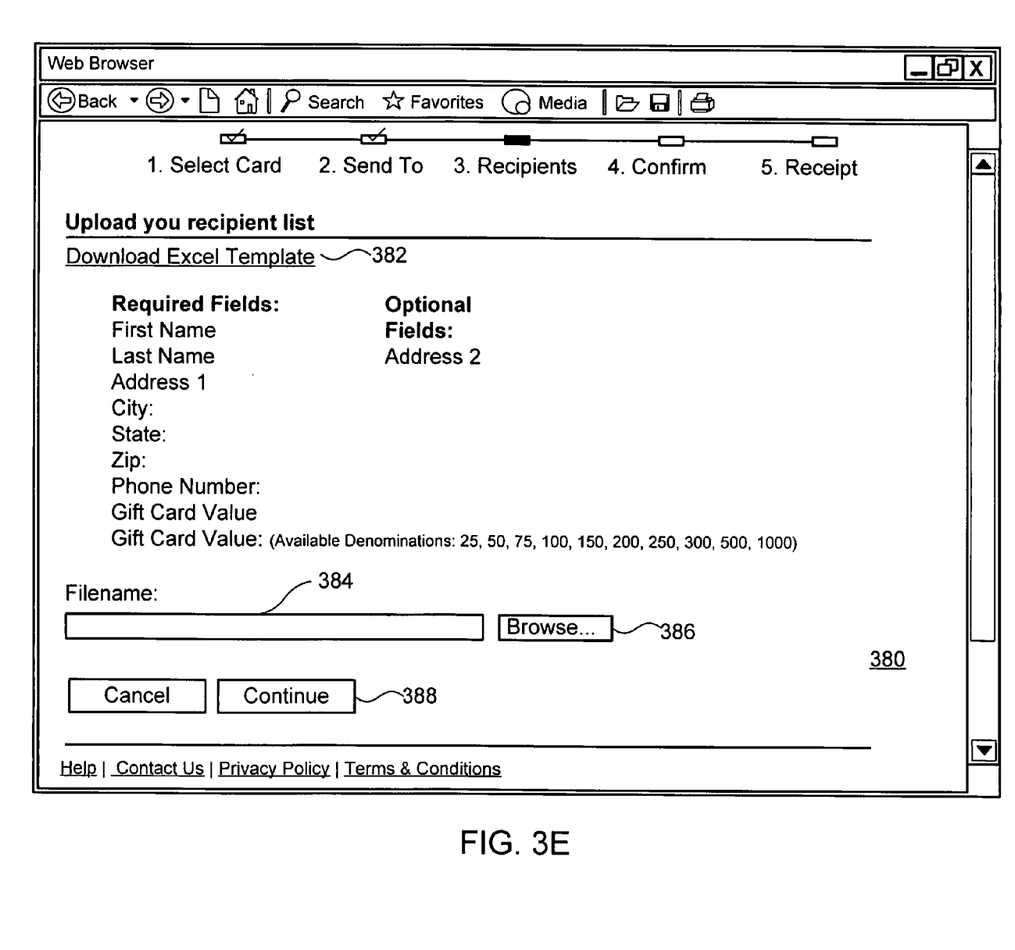

At block 218, the purchaser uses the personalized recipient display screen 380 to upload a file containing information to personalize the cards for the recipients. In a specific embodiment, the purchaser may download a template by selecting the template link 382. The template may comprise any of a variety of well known formats, including Excel, Word, Lotus, and the like. In other embodiments, the purchaser may generate a recipient information file simply by entering information in any of a number of recognized formats, for example, comma delineated. Once the purchaser completes the information in the template, or otherwise creates an information file, the purchaser may "attach" the recipient information file to the order by entering appropriate information into the filename field 384 or using the browse button 386 to locate the file using, for example, an explore feature. Once the file information is complete, the purchaser may select the continue button 388 to complete the entry of recipient information.

Figure 3F:
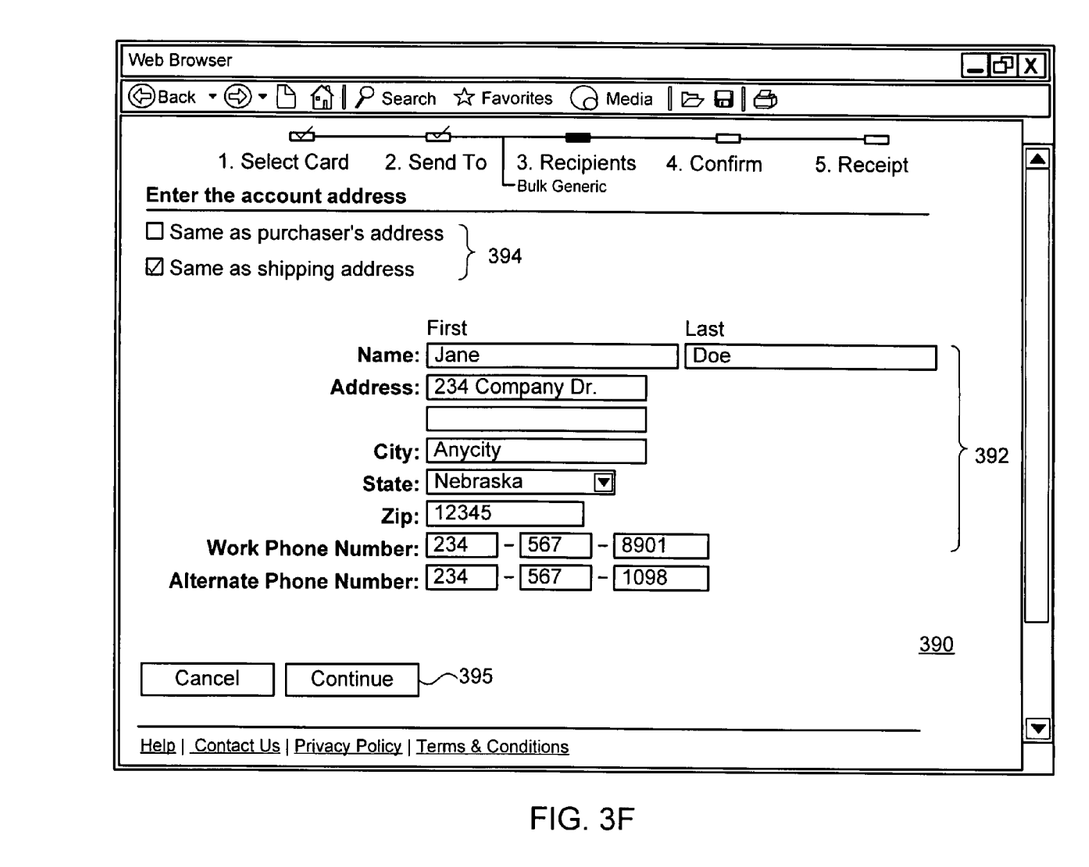

Selecting the continue button 388 of FIG. 3E causes the account information display screen 390 of FIG. 3F to be returned to the purchaser's computer. The account information display screen 390, in some embodiments, is used only for entering account information for generic cards. In other embodiments, it is used for both generic and personalized cards. The entry of account information is shown as block 220 of FIG. 2B. The account information display screen 390 includes fields 392 for entering name, address, and telephone number information related to the order. The fields 392 may be completed automatically if the purchaser selects one of the address selection buttons 394. The account information is used to populate the required fields on the account record which resides on the mainframe. Once the account information is entered, the purchaser may select the continue button 395 to send the information and advance to the next display screen.

Figure 3G:
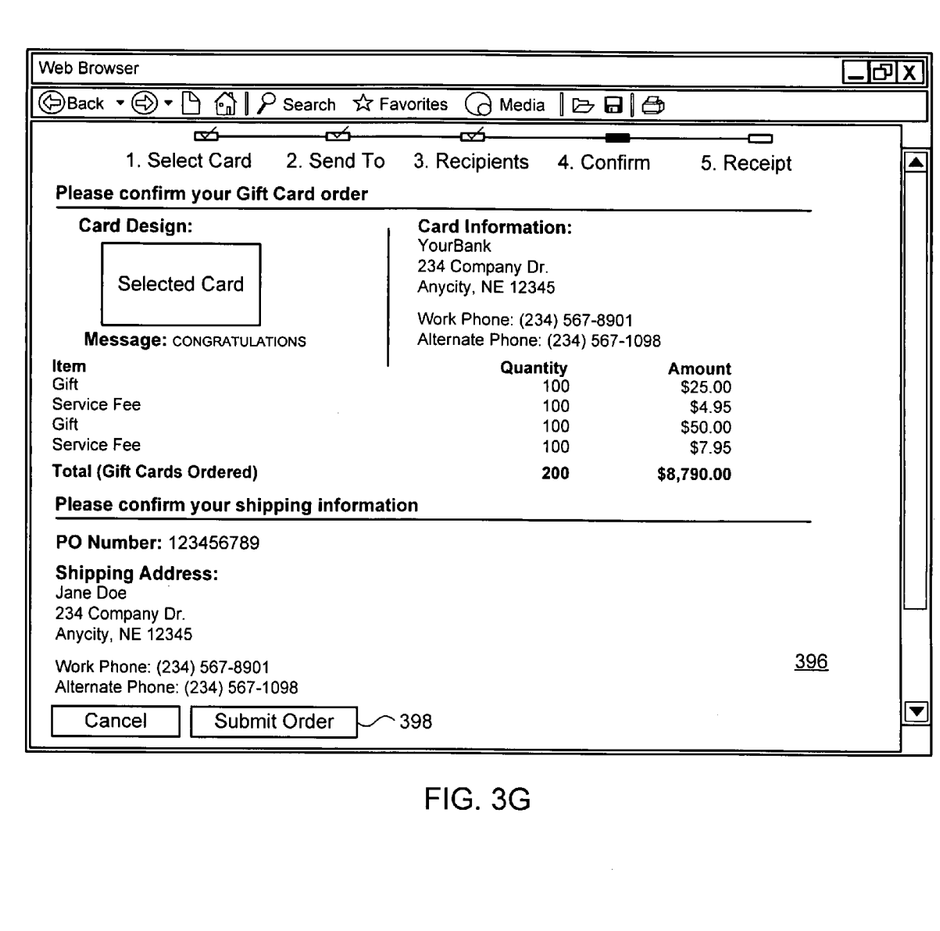

Selection of the continue button 395 of FIG. 3F causes the order confirmation display screen 396 of FIG. 3G to be returned to the purchaser's computer. Using this display screen 396, the purchaser may review the order information. If the information is accurate, then the purchaser may select the submit order button 398 to complete the order process. This is shown as block 222 of FIG. 2B. In some embodiments, once the order is submitted, the host computer system reformats the purchaser information as necessary and produces the cards, as is know in the art.

As with the previously-described method 200, the method 206 is exemplary, and other methods according to other embodiments may include more, fewer, or different steps than those described here. Further, the steps need to be conducted in the order illustrated and described. The same is true of the method 240, illustrated in FIG. 2C. The method 240 is used to monitor usage activity relating to cards acquired according to embodiments of the invention.

Figure 2C:
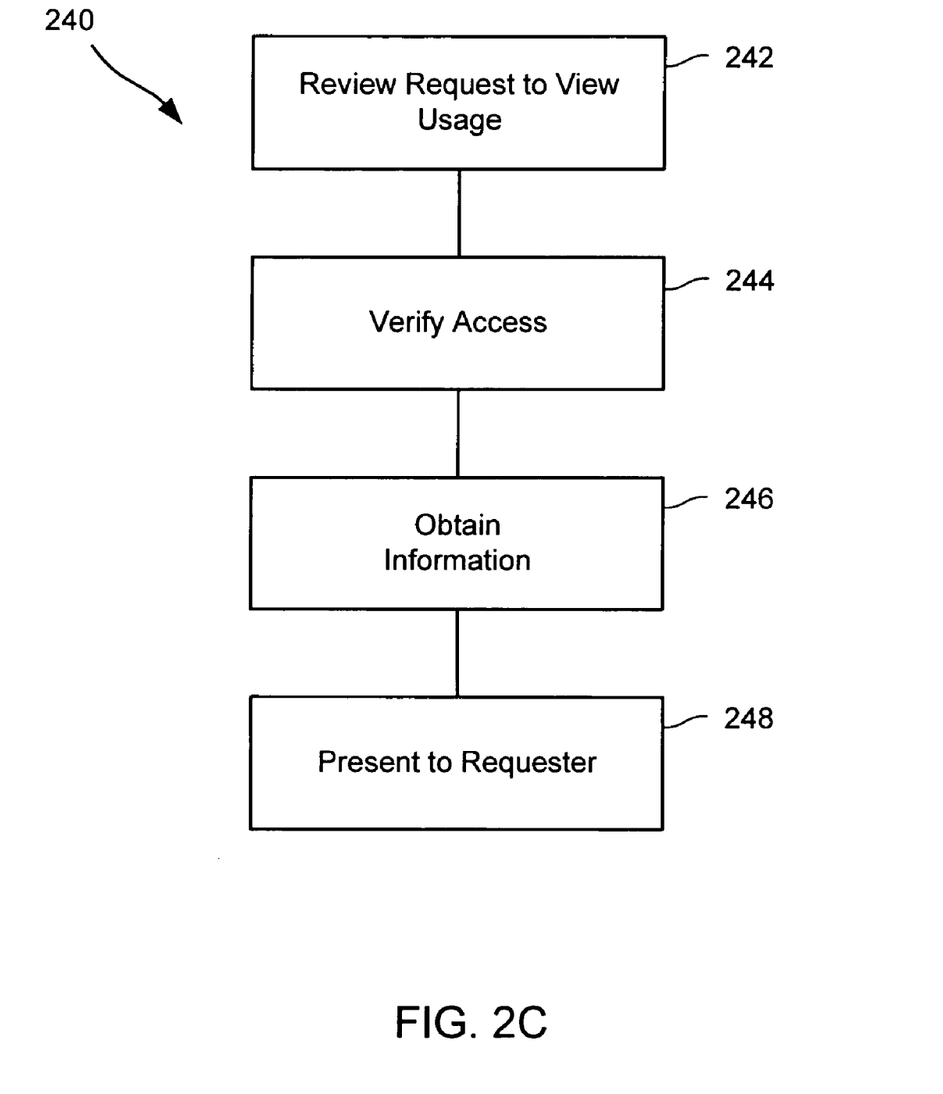
FIG. 2C depicts a method of obtaining card usage information according to embodiments of the invention.

The method 240 begins at block 242 wherein a user requests access to usage information. This may be accomplished by the user accessing a host computer system or other computing system housing card usage information via a web browser or the like. The computing system, at block 244, verifies the requestor's permission to access the information. As with the examples previously described, employers may wish to view the purchases made by employees using cards provided for travel purposes. Parents may wish to monitor the purchases made by their children. Other examples are possible. A person's privilege to access usage information may be determined at the time a card is ordered or may be determined at a later date. Establishing this privilege may include requesting and obtaining a user ID and/or password and storing the information so that it may be used to verify the person's access privilege.

Once the requestor's access privilege is verified, the computing system, at block 246, obtains the requested information, then presents the information to the requestor at block 248. The requestor may use a web browser, for example, to access the information from the computing system via the Internet or other network. Many other examples are possible.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. For example, those skilled in the art know how to arrange computers into a network and enable communication among the computers. Additionally, those skilled in the art will realize that the present invention is not limited to gift cards specifically or cards generally. For example, the present invention may be used to order any type of presentation instrument. Accordingly, the above description should not be taken as limiting the scope of the invention, which is defined in the following claims.

What is claimed is:

1. A method for ordering a plurality of presentation instruments in a single order, comprising:
   receiving at a host computer system a request from a purchaser to order the plurality of presentation instruments, wherein a presentation instrument comprises a physical device usable to settle a financial transaction;
   sending one or more files that are executable by a computer of the purchaser to produce one or more corresponding display screens programmed to collect purchase information relating to the plurality of presentation instruments;
   receiving at the host computer system the purchase information from the purchaser, wherein the purchase information comprises a recipient information file and wherein the purchase information comprises an order for a plurality of presentation instruments that comprise gift cards, at least some of which have different values associated therewith; and
   transmitting from the host computer system a user identifier which allows a user to access usage information relating to a presentation instrument;
   delivering the presentation instruments in accordance with the purchase information;
   receiving at the host computer system the user identifier and a request from the user to view the usage information; and
   sending a file to a computer of the user, wherein the file comprises the usage information.

2. The method of claim 1, wherein delivering the presentation instruments in accordance with the purchase information comprises delivering the presentation instruments to each of a plurality of recipients.

3. The method of claim 1, wherein delivering the presentation instruments in accordance with the purchase information comprises delivering the presentation instruments to the purchaser.

4. The method of claim 1, wherein delivering the presentation instruments in accordance with the purchase information comprises delivering the presentation instruments to a designee of the purchaser.

5. The method of claim 1, wherein the recipient information file comprises a selection from the group consisting of a spread sheet, a text file, and a data file.

6. The method of claim 1, wherein the purchase information comprises a message to be embossed on each card.

7. The method of claim 1, purchase information comprises a recipient name to be embossed on each card.

8. A method for ordering a plurality of presentation instruments in a single order, comprising:
   receiving at a host computer system a request from a purchaser to order the plurality of presentation instruments, wherein the presentation instruments comprise non-personalized cards usable to settle financial transactions;

sending one or more files that are executable by a computer of the purchaser to produce one or more corresponding display screens programmed to collect purchase information relating to the plurality of presentation instruments;

receiving at the host computer system the purchase information from the purchaser, and wherein the purchase information comprises an order for a plurality of presentation instruments that comprise gift cards, at least some of which have different values associated therewith;

transmitting from the host computer system a user identifier which allows a user to access usage information relating to a presentation instrument;

delivering the presentation instruments in accordance with the purchase information;

receiving at the host computer system the user identifier and a request from the user to view the usage information; and sending a file to a computer of the user, wherein the file comprises the usage information.

9. A system for processing orders for a plurality of presentation instruments ordered simultaneously, comprising:

a computing device programmed to:
   receive a request from a purchaser computer to order the plurality of presentation instruments, wherein a presentation instrument comprises a physical device usable to settle a financial transaction;
   send one or more files that are executable by a computer of the purchaser to produce one or more corresponding display screens programmed to collect purchase information relating to the plurality of presentation instruments;
   receive the purchase information from the purchaser computer, wherein the purchase information comprises an order for a plurality of presentation instruments that comprise gift cards, at least some of which have different values associated therewith; and
   send at least a portion of the purchase information to a presentation instrument production system; and a usage information system programmed to:
   transmit a user identifier which allows a user to access usage information relating to a presentation instrument;
   receive the user identifier and a request from the user to view the usage information; and
   send a file to a computer of the user, wherein the file comprises the usage information.

10. The system of claim 9, wherein the purchase information comprises a message to be embossed on each card.

11. The system of claim 9, wherein the purchase information comprises a recipient name to be embossed on each card.

12. The system of claim 9, wherein the purchase information comprises a recipient information file.

13. The system of claim 12, wherein the recipient information file comprises a selection from the group consisting of a spread sheet, a text file, and a data file.

14. The system of claim 9, wherein the presentation instruments comprise non-personalized cards.

15. A method of purchasing a plurality of presentation instruments in a single order, comprising:

sending to a host computer system from a purchaser computer a request to order the plurality of presentation instruments, wherein a presentation instrument comprises a physical device usable to settle a financial transaction;

receiving from the host computer system at the purchaser computer one or more files that are executable by the purchaser computer to produce one or more corresponding display screens programmed to collect purchase information relating to the plurality of presentation instruments;

sending the purchase information from the purchaser computer to the host computer system, wherein the purchase information comprises a recipient information file and wherein the purchase information comprises an order for a plurality of presentation instruments that comprise gift cards, at least some of which have different values associated therewith;

receiving from the host computer system a user identifier which allows a user to access usage information relating to a presentation instrument;

sending to the host computer system the user identifier and a request from the user to view the usage information; and receiving a file comprising the usage information.

16. The method of claim 15, further comprising receiving the presentation instruments in accordance with the purchase information.

17. The method of claim 15, wherein the recipient information file comprises a selection from the group consisting of a spread sheet, a text file, and a data file.

18. The method of claim 15, wherein the purchase information comprises a message to be embossed on each card.

19. The method of claim 15, purchase information comprises a recipient name to be embossed on each card.

* * * * *